(12) United States Patent
Iiduka

(10) Patent No.: US 11,247,256 B2
(45) Date of Patent: Feb. 15, 2022

(54) METHOD FOR CUTTING METAL PLATE, METHOD FOR MANUFACTURING METAL PRODUCT, AND METAL PRODUCT

(71) Applicant: Takashi Iiduka, Nara (JP)

(72) Inventor: Takashi Iiduka, Nara (JP)

( * ) Notice: Subject to any disclaimer, the term of this patent is extended or adjusted under 35 U.S.C. 154(b) by 0 days.

(21) Appl. No.: 16/626,920

(22) PCT Filed: Jun. 28, 2017

(86) PCT No.: PCT/JP2017/023702
§ 371 (c)(1),
(2) Date: Dec. 27, 2019

(87) PCT Pub. No.: WO2019/003333
PCT Pub. Date: Jan. 3, 2019

(65) Prior Publication Data
US 2020/0130041 A1    Apr. 30, 2020

(51) Int. Cl.
*B21D 28/16* (2006.01)
*B60R 22/18* (2006.01)

(52) U.S. Cl.
CPC .............. *B21D 28/16* (2013.01); *B60R 22/18* (2013.01); *B60R 2022/1806* (2013.01)

(58) Field of Classification Search
CPC ...... B21D 19/005; B21D 28/16; B21D 53/88; B21K 23/00; B60R 2022/1806; B60R 22/18
See application file for complete search history.

(56) References Cited

U.S. PATENT DOCUMENTS 4,353,235 A * 10/1982 Williamson ............. B21D 5/10
72/130
5,762,373 A    6/1998 Sugimoto
(Continued)

FOREIGN PATENT DOCUMENTS

CN    1065487 C    5/2001
CN    101090780 A    12/2007
(Continued)

OTHER PUBLICATIONS

"Japanese nip in with a rival to fine blanking", Metalworking Production., vol. 116, No. 1, Jan. 1, 1972, pp. 90-91. 2pp.
(Continued)

*Primary Examiner* — David M Upchurch
(74) *Attorney, Agent, or Firm* — Hauptman Ham, LLP

(57) ABSTRACT

A method for cutting a metal plate, a method for manufacturing a metal product, and the metal product are provided which enable the formation of cracks to be suppressed even with application of external force and enable strength of a product to be increased. A method for cutting a metal plate 2 of one aspect according to the present invention includes a crushing step and a separation step. The crushing step is a step of crushing a removal target part 22 of the metal plate 2 in a thickness direction of the metal plate 2 by applying, to the removal target part 22, force from both sides in the thickness direction so as to deform the removal target part 22 into a thin-walled part 23. The separation step is a step of separating, after crushing step, the thin-walled part 23 from a body 21 of the metal plate 2.

2 Claims, 4 Drawing Sheets

(56) References Cited

U.S. PATENT DOCUMENTS

| | | | |
|---|---|---|---|
| 2005/0050935 A1 | 3/2005 | Miyahara | |
| 2015/0298193 A1 | 10/2015 | Urabe | |
| 2015/0336619 A1 | 11/2015 | Tanaka et al. | |
| 2016/0101475 A1 | 4/2016 | Anderseck | |
| 2016/0207088 A1 | 7/2016 | Park | |
| 2016/0296989 A1* | 10/2016 | Nishimura | B21D 22/26 |
| 2018/0272407 A1* | 9/2018 | Nishimura | B23D 15/06 |
| 2018/0333760 A1* | 11/2018 | Yasutomi | B21D 28/16 |
| 2019/0263350 A1* | 8/2019 | Ruthinowski | A44B 11/2557 |

FOREIGN PATENT DOCUMENTS

| | | |
|---|---|---|
| CN | 101862785 A | 10/2010 |
| CN | 201815586 U | 5/2011 |
| CN | 104870117 A | 8/2015 |
| CN | 104870118 A | 8/2015 |
| CN | 105228769 A | 1/2016 |
| CN | 105798106 A | 7/2016 |
| CN | 105921595 A | 9/2016 |
| EP | 1852196 A1 | 11/2007 |
| EP | 3156172 A1 | 4/2017 |
| JP | H6-65442 B2 | 8/1994 |
| JP | H7227627 A | 8/1995 |
| JP | H9-164907 A | 6/1997 |
| JP | 2744963 B2 | 4/1998 |
| JP | 2002361669 A | 12/2002 |
| JP | 2006-255740 A | 9/2006 |
| JP | 2016159300 A | 9/2016 |

OTHER PUBLICATIONS

Extended European Search Report in EP Application No. 17915373.9, dated May 20, 2020. 10pp.
Office Action in CN Application No. 201780092486.8, dated Sep. 3, 2020. 19pp.
International Search Report in PCT Application No. PCT/JP2017/023702, dated Aug. 15, 2017, 2pp.
Notice of Allowance in CN Application No. 201780092486.8, dated Oct. 27, 2021. 9pp.

* cited by examiner

METHOD FOR CUTTING METAL PLATE, METHOD FOR MANUFACTURING METAL PRODUCT, AND METAL PRODUCT

RELATED APPLICATIONS

The present application is a National Phase of International Application Number PCT/JP2017/023702, filed Jun. 28, 2017.

TECHNICAL FIELD

The present invention relates to a method for cutting a metal plate, a method for manufacturing a metal product, and the metal product.

BACKGROUND ART

In general, a blanking process is known as a method for shearing a metal plate by using a press to obtain a product (see, for example, Patent Literature 1).

The blanking process described in Patent Literature 1 is a fine blanking process and can highly accurately punch out a product from a work piece. For example, in the fine blanking process, a cutting punch punches out part corresponding to a product with a removal target part of a metal plate being firmly held by a die and a plate holding die and the part corresponding to the product being applied with counter pressure by a counter punch. In this way, the product is punched out from the metal plate by shear force.

Here, a product punched out by a common blanking process has an end surface as shown in FIG. 4. As shown in FIG. 4, the end surface of the product has a sag 61, a sheared surface 62, and a fracture surface 63 which are formed in order from one edge portion toward the other edge portion in a thickness direction of the product, and a burr 64 is formed at the other edge portion.

In contrast, in the case of the fine blanking process, an end surface of a product has a sag, a sheared surface, fracture surface, and a burr formed in the same manner as the common blanking process, but the sheared surface has a large ratio, and the fine blanking process can thus produce precision products.

CITATION LIST

Patent Literature

Patent Literature 1: JP 2006-255740 A

Here, when excessive external force is applied such a product, a crack may extend to cause destruction. For example, if an edge portion of the product has a finely uneven portion such as a burr, a crack is likely to be formed from this edge portion.

In this regard, the fine blanking process enables precise processing, but a fracture surface and/or a burr are formed at the edge portion in a similar manner to a general punching process, and therefore, a crack is likely to be formed at the edge portion when external force of a predetermined value or more is applied. Thus, even with the fine blanking process, it is impossible to increase the strength of a product to a certain level or higher.

On the other hand, you may think that the strength of a product would be improved by performing a shaving process on a cut surface of the product to scrape off a burr formed at an edge portion of the product to finish the cut surface. Performing the shaving process, however, makes the cut surface of the product smooth in appearance, but a burr is formed newly at the edge portion due to the shaving process, and therefore, it is not possible to improve the strength of the product.

SUMMARY OF INVENTION

In view of the foregoing, it is an object of the present invention to provide a method for cutting a metal plate which enables the formation of cracks in a product to be suppressed even with application of external force and enables strength of the product to be increased, a method for manufacturing a metal product, and the metal product.

A method of one aspect according to the present invention is a method for cutting a metal plate and includes a crushing step of crushing a removal target part of the metal plate in a thickness direction of the metal plate by applying, to the removal target part, force from both sides in the thickness direction so as to deform the removal target part into a thin-walled part, and a separation step of separating, after the crushing step, the thin-walled part from a body of the metal plate.

A method of one aspect according to the present invention is a method for manufacturing a metal product by cutting off a removal target part from a metal plate and includes crushing the removal target part in a thickness direction of the metal plate by applying, to the removal target part, force from both sides in the thickness direction so as to deform the removal target part into a thin-walled part, and a separation step of separating, after the crushing step, the thin-walled part from a body of the metal plate to obtain the metal product.

A metal product of one aspect according to the present invention includes an end surface having a fracture surface which is, in a thickness direction of the metal product, shorter than a thickness of the metal product, the fracture surface being at a middle location in the thickness direction of the metal product.

DESCRIPTION OF EMBODIMENTS

The present embodiment relates to a method for cutting a metal plate 2, a method for manufacturing a metal product, and the metal product. In particular, the present embodiment relates to: a method for cutting the metal plate 2 by performing a shearing process on the metal plate 2 to obtain a product; a method for manufacturing a metal product; and the metal product. An embodiment of the present invention will be described below with reference to the drawings.

Figure 1A:
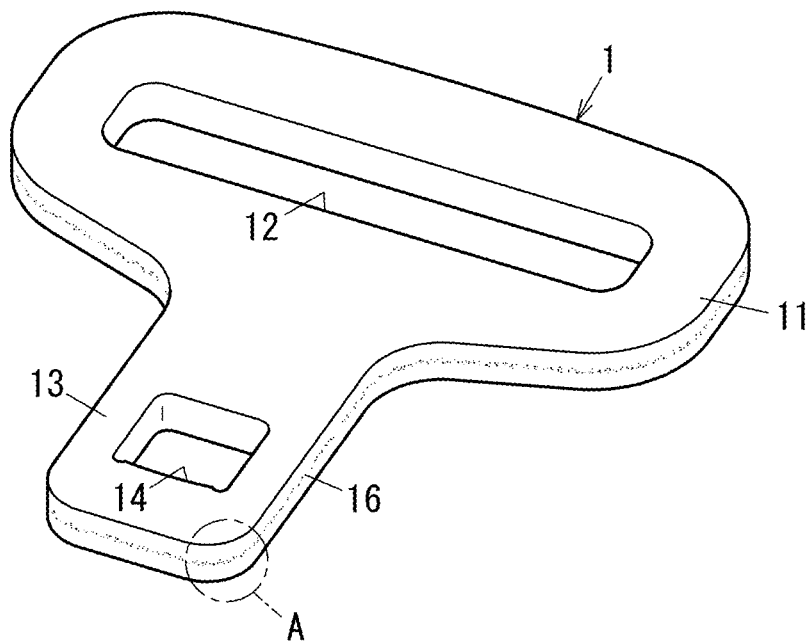
FIG. 1A is a perspective view illustrating a seatbelt tongue plate of one embodiment of the present invention.
Figure 1B:
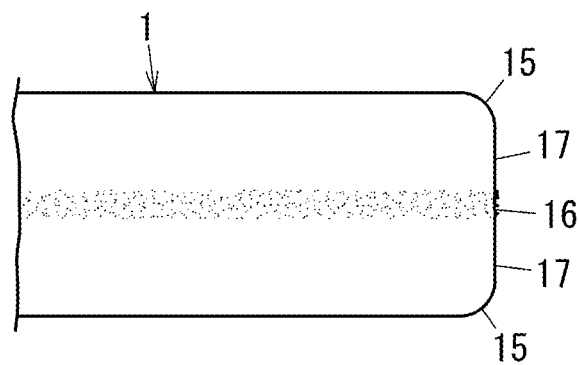
FIG. 1B is an enlarged view of part A of FIG. 1A.

The metal product of the present embodiment is a seatbelt tongue plate 1 as shown in FIG. 1A. The seatbelt tongue plate 1 is used in a seat belt device. The seatbelt tongue plate 1 is manufactured by performing a blanking process of the present embodiment on the metal plate 2. The seatbelt tongue plate 1 obtained by the blanking process of the present embodiment has an end surface which is prescribed as shown in FIG. 1B. The end surface has a beveled surface 15, a sheared surface 17, a fracture surface 16, a sheared surface 17, and a beveled surface 15 in order from one edge portion to the other edge portion in a thickness direction of the seatbelt tongue plate 1. In other words, the fracture surface 16 of the present embodiment is narrower than the thickness of the seatbelt tongue plate 1 and is formed at a middle location in the thickness direction of the seatbelt tongue plate 1. Thus, the fracture surfaces 16 are not formed at the edge portions of the end surface serving as a cut surface, and therefore, the seatbelt tongue plate 1 of the present embodiment can have breaking strength that is conventionally unavailable. The seatbelt tongue plate 1 of the present embodiment includes a grip 11 and an insertion part 13.

Note that in the present embodiment, the end surface which is prescribed is an end surface formed over the entirety of the outer perimeter of the seatbelt tongue plate 1, but only part of the outer perimeter may be the prescribed end surface.

The grip 11 is a part which is to be held by a user when the user attaches the seatbelt tongue plate 1 to a buckle. For example, part or the entirety of the grip 11 is covered with a resin molding part (not shown). The grip 11 has a through hole 12 which a webbing belt is to run through.

The insertion part 13 is a part to be inserted into the buckle. The seatbelt tongue plate 1 is held by the buckle by inserting the insertion part 13 into the buckle. The insertion part 13 extends from the grip 11 and is integrally formed with the grip 11. The insertion part 13 is narrower than the grip 11 and has a hook hole 14 to which the buckle is hooked. The hook hole 14 is formed at a center part in a width direction and in a tip portion of an extension direction of the insertion part 13.

The seatbelt tongue plate 1 having the configuration described above is manufactured by the following method. The method for manufacturing the seatbelt tongue plate 1 (hereinafter referred to as a manufacturing method of the present embodiment) will be described below.

Figure 2:
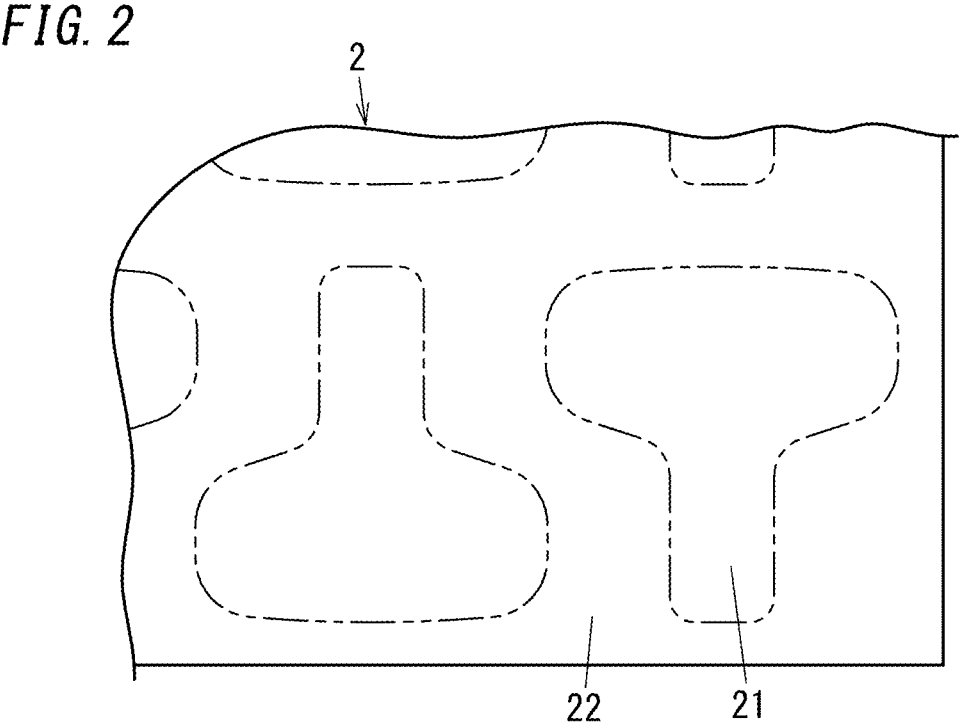
FIG. 2 is a plan view illustrating a removal target part and a body of a metal plate.

The manufacturing method of the present embodiment is a method for obtaining the seatbelt tongue plate 1 as a metal product by performing a blanking process on the metal plate 2 (work piece). As the metal plate 2, for example, an iron plate or a stainless steel plate having a thickness of 3 mm is preferably used. As shown in FIG. 2, the metal plate 2 prior to processing has an area corresponding to a body 21 which is formed into a metal product by shaping and an area corresponding to a removal target part 22 which will be cut and removed from the body 21 by the shaping. Note that in the metal plate 2, the body 21 and the removal target part 22 are indistinguishable in appearance.

The manufacturing method of the present embodiment includes a rough finishing step, a beveling step, a crushing step, and a separation step.

The rough finishing step is a step of roughly obtaining the plurality of seatbelt tongue plates 1 from the metal plate 2 serving as a base material (the shaped piece roughly obtained by the rough finishing step is referred to as a work 20 in process). The work 20 in process includes a body 21 and a removal target part 22 around the body 21. After the rough finishing step, the removal target part 22 is smaller than prior to the rough finishing step.

Figure 3A:
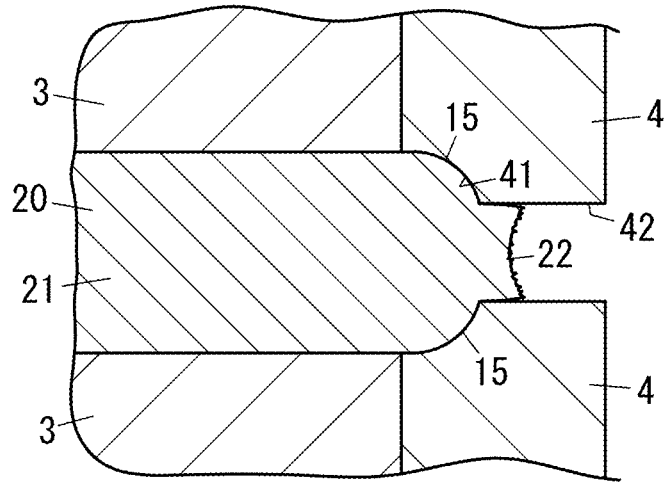
FIGS. 3A to 3C are sectional views illustrating a method for manufacturing the seatbelt tongue plate.

The beveling step is performed after the rough finishing step. As illustrated in FIG. 3A, the beveling step is a step of beveling a corner formed between a front surface and the end surface of the seatbelt tongue plate 1 or a corner formed between a back surface and the end surface of the seatbelt tongue plate 1. Chamfering, round beveling, or the like is selected in accordance with the product. When there is no need to bevel the corners of a product, the beveling step may be omitted.

The beveling step of the present embodiment is a step of forming the beveled surfaces 15 at the corners in the thickness direction of the seatbelt tongue plate 1. In the present embodiment, the beveled surfaces 15 are round surfaces. Note that the round surface is a beveled surface having a curved and outwardly protruding shape. The mold used in the beveling step includes: a pair of plate holding molds 3 configured to hold the body 21 by pinching the body 21 from both sides in a thickness direction of the body 21; and a pair of round press molds 4.

The pair of plate holding molds 3 have shaping surfaces (counter surfaces) which are flat surfaces. The shaping surfaces of the pair of plate holding molds 3 are apart from each other. Each round press mold 4 has a shaping surface including a concavely rounded surface 41 and a flat protruding surface 42. Each concavely rounded surface 41 is continuous with the shaping surface of an adjoining one of the plate holding molds 3. The concavely rounded surface 41 has an inner side edge which coincides with an outer side edge of the plate holding mold 3. The flat protruding surface 42 has an edge which borders the concavely rounded surface 41 and which coincides with the outer side edge of the concavely rounded surface 41.

In the beveling step, the body 21 is placed so as to be pinched between the pair of plate holding molds 3, and in this state, parts corresponding to corners of the body 21 and the removal target part 22 are pressed with the pair of round press molds 4 from both sides in a thickness direction of the work 20 in process. Thus, the work 20 in process has the corners of the body 21 which are formed into the beveled surfaces 15 as compressed round surface, and the removal target part 22, which is crushed to a certain extent, extends from the end surface of the body 21.

Figure 3B:
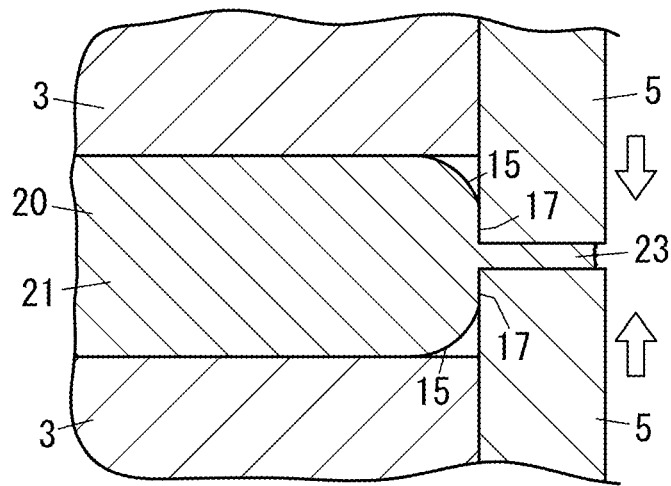
Figure 3C:
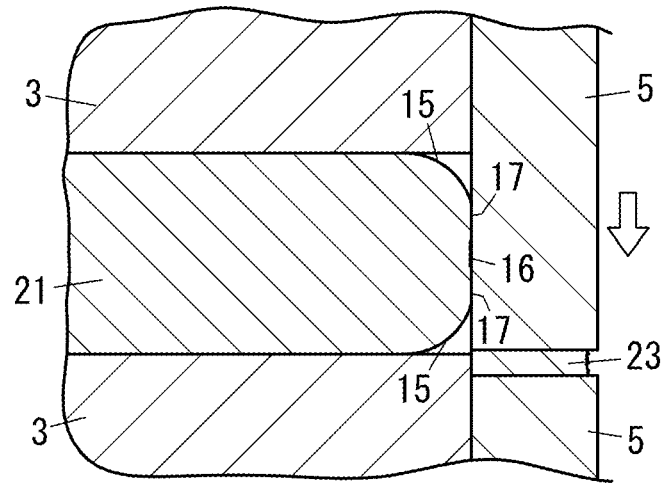
Figure 4:
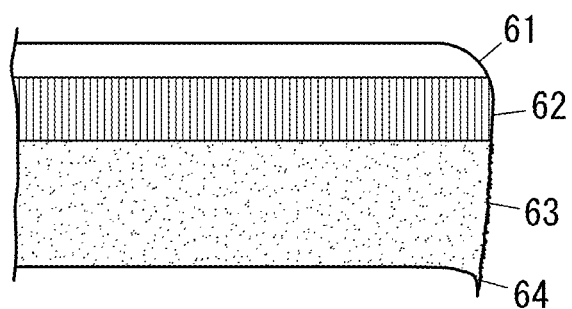
FIG. 4 is a side view illustrating a main part of an end of a product obtained by a conventional blanking process.

The crushing step is performed after the beveling step. The crushing step adopts a pair of finishing press molds 5 instead of the pair of round press molds 4. The crushing step is, as shown in FIG. 3B, a step of applying force mainly to the removal target part 22 from both sides in the thickness direction with the pair of finishing press molds 5 to further crush the removal target part 22 in the thickness direction, thereby deforming the removal target part 22 into a thin-walled part 23. A mold adopted in the crushing step includes: the pair of plate holding molds 3 configured to hold the body 21 by pinching the body 21 from the both sides in the thickness direction; and the pair of finishing press molds 5 configured to crush the removal target part 22 in the thickness direction.

The pair of finishing press molds 5 are configured to press the removal target part 22 of the work 20 in process from the both sides in the thickness direction. In addition, the pair of finishing press molds 5 enable shear force to be applied to the end surface of the work 20 in process to form the sheared surfaces 17 at an upper part and a lower part of the end surface. Accordingly, in the crushing step, pressing the removal target part 22 with the pair of finishing press molds 5 from the both sides in the thickness direction to apply compression force to the removal target part 22 enables the removal target part 22 to be deformed into the thin-walled part 23 and also enables the sheared surfaces 17 to be formed at upper and lower parts of the end surface of the body 21.

The thin-walled part 23 produced by the crushing step is thinner than the thickness of the body 21 and is formed at a middle location in the thickness direction of the body 21 (between the front surface and the back surface of the body 21). In the present embodiment, the thin-walled part 23 extends from a center part in the thickness direction of the body 21 but may be formed at a location deviated to the front surface or the back surface as long as the location is within the thickness of the body 21.

The separation step is performed after the crushing step. The separation step is a step of separating the thin-walled part 23 produced by the crushing step from the body 21. In the separation step, the pair of finishing press molds 5 and the pair of plate holding molds 3 are relatively moved from a state directly after the removal target part 22 is crushed in the crushing step in the thickness direction of the product so as to separate the thin-walled part 23 from the body 21. As the relative movement between the pair of finishing press molds 5 and the pair of plate holding molds 3, one of the pair of plate holding molds 3 and the pair of finishing press molds 5 may be fixed and the other may be moved, or both of the pair of plate holding molds 3 and the pair of finishing press molds 5 may be moved in the opposite directions.

Note that according to FIGS. 3A and 3B, the pair of plate holding molds 3 are displaced with respect to the body 21 when the beveling step proceeds to the crushing step. In this regard, for example, the pair of plate holding molds 3 may be moved toward the finishing press molds 5, or molds different from the plate holding molds 3 used in the beveling step may be used.

The seatbelt tongue plate 1 formed through these steps has the end surface having the fracture surface 16 formed at a center part in the thickness direction, the pair of sheared surfaces 17 formed on both outer sides of the fracture surface 16 in the thickness direction, and the beveled surfaces 15 are formed on both outer sides of the pair of sheared surfaces 17 in the thickness direction. Thus, the seatbelt tongue plate 1 of the present embodiment has corners where the fracture surfaces 16 are not formed, and therefore, even if excessive external force is applied to the seatbelt tongue plate 1, it is possible to suppress the formation of cracks from fine unevenness of the fracture surface 16, and it is possible to suppress the formation of a crack starting from the fine unevenness. As a result, the seatbelt tongue plate 1 of the present embodiment enables the strength of the product to be increased.

[Application]

The manufacturing method of the present embodiment includes the rough finishing step, the beveling step, the crushing step, and the separation step. However, the rough finishing step and the beveling step may be performed as required and are not necessarily required steps.

The thin-walled part 23 in the embodiment is formed at the center part in the thickness direction of the body 21 but may alternatively be formed at a location deviated to the front surface or the back surface in the thickness direction and is not formed at least at the corner. That is, the thin-walled part 23 is formed at least at a middle location in the thickness direction of the body 21. The manufacturing method of the embodiment described above enables the thin-walled part 23 to be formed at a location deviated to the front surface or the back surface in the thickness direction of the end surface of the body 21, and therefore, it is possible to accordingly set the location of the fracture surface 16 as required.

The manufacturing method of the embodiment is the method for manufacturing the seatbelt tongue plate 1 as a metal product but is not limited to the manufacturing method of the seatbelt tongue plate 1 and is generally applicable to metal processing. Moreover, the manufacturing method of the embodiment may be applied to the method for cutting the metal plate 2. Thus, the cut surface of the metal plate 2 can be an end surface which is smooth and which hardly cracks.

The removal target part 22 of the embodiment is a part other than the body 21 of the metal plate. However, it is at least an outer periphery of the body 21 that is to be deformed into the thin-walled part 23, and it is not necessary to deform the entirety of the removal target part 22 into the thin-walled part 23.

In addition, the configuration of the embodiment may accordingly be modified in design as long as it does not deviate from the spirit of the invention.

[Comparative Experiment]

Comparative experiment on the tensile strength was performed between a metal piece produced from a metal plate by the manufacturing method of the embodiment, and a metal piece punched out from a metal plate by a conventional manufacturing method. In the following description, the metal piece produced by the manufacturing method of the embodiment is referred to as a metal piece of an example and the metal piece manufactured by the conventional manufacturing method is referred to as a metal piece of a comparative example.

EXAMPLE

The metal piece of the example is a metal piece manufactured from a metal plate being made of mechanical structure carbon steel (S55C), having a plate thickness of 3.0 mm, and having hardness of 45±2 HRC by the manufacturing method of the embodiment to have a rectangular shape of 25.4 mm (W)×100 mm (L).

Comparative Example 1

A metal piece of Comparative Example 1 is a metal piece manufactured from a metal plate being made of mechanical structure carbon steel (S55C) as the same material as Example, having a plate thickness of 3.0 mm, and having hardness of 45±2 HRC by the fine blanking process to have a rectangular shape of 25.4 mm (W)×100 mm (L). Burrs formed on the fracture surface were left intact.

Comparative Example 2

A metal piece of Comparative Example 2 is a metal piece manufactured from a metal plate being made of mechanical structure carbon steel (S55C) as the same material as Example, having a plate thickness of 3.0 mm, and having hardness of 45±2 HRC by the fine blanking process to have a rectangular shape of 25.4 mm (W)×100 mm (L). Burrs formed on the fracture surface were removed by chamfering.

Comparative Example 3

A metal piece of Comparative Example 3 is a metal piece manufactured from a metal plate being made of mechanical structure carbon steel (S55C) as the same material as Example, having a plate thickness of 3.0 mm, and having hardness of 45±2 HRC by the punching process with a press to have a rectangular shape of 25.4 mm (W)×100 mm (L).

Comparative Example 4

A metal piece of Comparative Example 4 is a metal piece manufactured from a metal plate being made of mechanical structure carbon steel (S55C) as the same material as Example, having a plate thickness of 3.0 mm, and having hardness of 45±2 HRC with a ire electric discharge machine to have a rectangular shape of 25.4 mm (W)×100 mm (L).

(Test Conditions)

Test condition were such that both longitudinal ends of each of the metal pieces of Example and Comparative Examples 1 to 4 were held with a test apparatus, and in this state, pull force was applied in directions away from each other along the longitudinal direction of the metal piece and was gradually increased, and the pull force at fracture of the metal plate was measured. Five test pieces were produced for each of the metal piece of Example and the metal pieces of Comparative Examples 1 to 4, and the five test pieces were tested under the above-described conditions. An average value was then calculated from values obtained from the five test pieces, and the average values of the test pieces of Example and Comparative Examples 1 to 4 were compared.

Test results are shown below.

TABLE 1

| | Load At Fracture [kN] | Part Where Crack Is Formed |
| --- | --- | --- |
| Example | 50.5 | Principal Surface |
| Comparative Example 1 | 37.8 | End Surface (Fracture surface) |
| Comparative Example 2 | 38.2 | End Surface (Fracture surface) |
| Comparative Example 3 | 34.3 | End Surface (Fracture surface) |
| Comparative Example 4 | 42 | Edge |

The test showed that the metal piece of Example has higher tensile strength than the metal pieces of Comparative Examples 1 to 4.

Situations at breakage was such that the metal piece of Example was cracked from either of principal surfaces, not the fracture surface, whereas the metal pieces of Comparative Examples 1 to 3 were cracked from their fracture surfaces, and the metal piece of Comparative Example 4 was cracked from its edge.

The reason why a difference in tensile strength occurs between the metal piece of Example and the metal piece of Comparative Example 4 is probably that an edge portion of the metal piece of Example is beveled to be a compressed round surface (round pressed surface), and therefore, the metal piece of Example is hardly fractured from the edge, which contributes to the increase of the tensile strength.

[Advantages]

As described above, the method for cutting the metal plate 2 of the embodiment has the following features. That is, the method for cutting the metal plate 2 of the embodiment includes the crushing step and the separation step. The crushing step is a step of crushing the removal target part 22 of the metal plate 2 in a thickness direction of the metal plate 2 by applying, to the removal target part 22, force from both sides in the thickness direction so as to deform the removal target part 22 into the thin-walled part 23. The separation step is a step of separating, after crushing step, the thin-walled part 23 from the body 21 of the metal plate 2. The method for cutting the metal plate 2 having these features is hereinafter referred to as the cutting method of the metal plate 2 of the first aspect.

The cutting method of the metal plate 2 of the first aspect enables a fracture surface of the body 21 to be located at a middle part in a thickness direction of the end surface of the body 21. Thus, as compared with a conventional product having a fracture surface formed on a corner of a body 21, cracks are less likely formed from the fine unevenness of the fracture surface, and the strength of the body 21 can be improved.

The method for manufacturing the metal product of the embodiment has the following features. That is, the method for manufacturing the metal product of the embodiment is a method for manufacturing a metal product by cutting off a removal target part 22 from a metal plate 2. The method for manufacturing a metal product of the embodiment includes a crushing step and a separation step. The crushing step is a step of crushing a removal target part 22 of the metal plate 2 in a thickness direction of the metal plate 2 by applying, to the removal target part 22, force from both sides in the thickness direction so as to deform the removal target part 22 into a thin-walled part 23. The separation step is a step of separating, after the crushing step, the thin-walled part 23 from a body 21 of the metal plate 2 to obtain the metal product. The method for manufacturing a metal product having these features is hereinafter referred to as a manufacturing method of a metal product of a first aspect.

The manufacturing method of the metal product of the first aspect enables a fracture surface of the metal product to be located at a middle part in a thickness direction of the end surface of the body 21. Thus, as compared with a conventional product having a fracture surface formed on a corner of a metal product, cracks are less likely formed from the fine unevenness of the fracture surface, and the strength of the metal product can be improved.

The method for manufacturing the metal product of the embodiment has the following additional features. That is, in a method for manufacturing a metal product referring to the manufacturing method of the metal product of the first aspect, the metal product is a seatbelt tongue plate 1 which is to be attachably and detachably inserted into a buckle of a seat belt device. The method for manufacturing the metal product is hereinafter referred to as a manufacturing method of a metal product of a second aspect.

According to the manufacturing method of the metal product of the second aspect, it is possible to increase the strength of the seatbelt tongue plate 1, which is easily subjected to instantaneous excessive external force.

The metal product of the embodiment has the following features. That is, the metal product of the embodiment is a metal product formed by cutting off a removal target part 22 from a metal plate 2. The metal product includes an end surface having a fracture surface 16 obtained by cutting off the removal target removal target part 22, the fracture surface 16 being shorter than a thickness of the metal product in a thickness direction of the metal product, the fracture surface being at a middle location in the thickness direction of the metal product. The metal product having these features is hereinafter referred to as a metal product of a first aspect.

According to the metal product of the first aspect, the fracture surface 16 is formed at the middle location in the thickness direction of the metal product and is not formed at the corner of thickness direction, and therefore, it is possible to obtain the metal product in which the formation of a crack starting from fine unevenness on the fracture surface can be suppressed and which has higher strength than conventional product.

The metal product of the embodiment has the following additional features. That is, in the metal product of the first aspect, the end surface of the metal product has: a pair of sheared surfaces 17 on both outer sides of the fracture surface 16 in the thickness direction of the metal product; and a pair of beveled surfaces 15 on both outer sides of the sheared surfaces 17 in the thickness direction of the metal product. The metal product having this feature is hereinafter referred to as a metal product of a second aspect.

According to the metal product of the second aspect, the sheared surfaces 17 and the beveled surfaces 15 are provided on the both sides of the fracture surface 16 in the thickness direction, and therefore, the end surface metal product including the above-mentioned surfaces (cut end surface) is smooth in appearance, and it is possible to further suppress the formation of cracks.

The metal product of the embodiment has the following additional features. That is, in the metal product of the second aspect, each of the pair of beveled surfaces 15 is a compressed rounded surface. The metal product having the feature is hereinafter referred to as a metal product of a third aspect.

According to the metal product of third aspect, each beveled surface 15 is a compressed rounded surface, it is possible to further suppress the formation of cracks at the corners.

The metal product of the embodiment has the following additional features. That is, the metal product of the embodiment referring to the metal product of any one of the first to third aspects, the metal product is a seatbelt tongue plate 1 which is to be attachably and detachably inserted into a buckle of a seat belt device. The metal product having this feature is hereinafter referred to as a metal product of a fourth aspect.

According to the metal product of fourth aspect, the seatbelt tongue plate 1 can be made stronger in strength than conventional products.

REFERENCE SIGNS LIST

1 SEATBELT TONGUE PLATE
15 BEVELED SURFACE
16 FRACTURE SURFACE
17 SHEARED SURFACE
2 METAL PLATE
21 BODY
22 REMOVAL TARGET PART
23 THIN-WALLED PART

The invention claimed is:

1. A method for manufacturing a metal product by cutting off a removal target part from a metal plate,
the metal plate including, prior to processing, an area corresponding to a body which is formed into the metal product by shaping and an area corresponding to a removal target part which is cut and removed from the body by the shaping, the body and the removal target part being indistinguishable in appearance in the metal plate,
the method comprising:
beveling, while placing the body so as to be pinched between a pair of plate holding molds having flat shaping surfaces, pressing parts corresponding to corners of the body and the removal target part with a pair of round press molds having shaping surfaces including a concavely rounded surface and a flat protruding surface, from both sides in a thickness direction of the metal plate, so that the metal plate has the corners of the body which are formed into the beveled surfaces as compressed round surface, and the removal target part, which is crushed, extends from an end surface of the body,
crushing, after the beveling step, with a pair of finishing press molds having flat shaping surfaces, while the body is being be pinched between the pair of plate holding molds, the removal target part in a thickness direction of the metal plate by applying, to the removal target part, force from both sides in the thickness direction so as to deform the removal target part into a thin-walled part, and applying shear force to the end surface of the body so as to form sheared surfaces at an upper part and a lower part of the end surface, and
a separation step of separating, after the crushing step, the thin-walled part from a body of the metal plate to obtain the metal product.

2. The method of claim 1, wherein
the metal product is a seatbelt tongue plate which is to be attachably and detachably inserted into a buckle of a seat belt device.

\* \* \* \* \*